United States Patent [19]
Mihara et al.

[11] 3,852,504
[45] Dec. 3, 1974

[54] PROCESS FOR COMPLETE SEPARATION OF CONSTITUENTS OF RICE-BRAN AND THE LIKE

[75] Inventors: Shigetoshi Mihara; Yanosuke Inaba, both of Tokyo; Koichi Tachibana; Tomio Endo, both of Saitama; Eiichiro Yasui, Urawa, all of Japan

[73] Assignee: Nakataki Pharm. Industry Co., Ltd., Tokyo, Japan

[22] Filed: Sept. 5, 1972

[21] Appl. No.: 286,602

Related U.S. Application Data

[63] Continuation of Ser. No. 26,089, April 6, 1970, abandoned.

[30] Foreign Application Priority Data
Apr. 9, 1969  Japan.............................. 44-27363

[52] U.S. Cl................ 426/373, 426/478, 426/481, 426/489, 260/123.5, 260/928, 260/412.3, 426/430, 426/417
[51] Int. Cl. .............................................. A23j 1/14
[58] Field of Search ...................... 99/2, 14, 17, 80; 260/123.5, 41.2, 412.3, 412.4; 241/6, 12

[56] References Cited
UNITED STATES PATENTS

| | | | |
|---|---|---|---|
| 2,732,395 | 1/1956 | Bolley | 260/461 |
| 3,519,431 | 7/1970 | Wayne | 99/80 |
| 3,591,665 | 7/1971 | Kimura et al. | 260/298 |

Primary Examiner—Norman Yudkoff
Assistant Examiner—Hiram H. Bernstein
Attorney, Agent, or Firm—Woodhams, Blanchard & Flynn

[57] ABSTRACT

All the constituents of seeds and brans of cereal grains, especially rice bran, are recovered by mixing the same with an excess of an aqueous acid solution, pulverizing the mixture, separating an emulsified solution of the dissolved phytin and the protein bonded with the oil dispersed in the acid solution from the solid residue, and screening the solid residue to separate crude fiber-containing substances from a starch-rice fraction.

7 Claims, No Drawings

PROCESS FOR COMPLETE SEPARATION OF CONSTITUENTS OF RICE-BRAN AND THE LIKE

This is a continuation of application Ser. No. 26,089, filed Apr. 6, 1970 and now abandoned.

BACKGROUND OF THE INVENTION

1. Field of the Invention

The present invention relates to a process for the complete separation of the major constituents of seeds and brans of cereal grains, particularly rice-bran.

The production of rice has increased year by year, but rice-bran is being used primarily as a raw material of oil or as an animal feed. Although the protein and the starch of rice-bran are of excellent quality and highly nutritive, these ingredients are hitherto not been fully utilized, as foods because the contents of the respective components of rice-bran are rather close to each other and, therefore, there is no suitable means for isolating and concentrating each of the respective components. It is impossible to separate them effectively by applying any known separation method which can be used for other plant constituents. The composition of rice-bran is generally 11 – 13 percent (percent is by weight, here and hereinafter) of water, 18 – 21 percent of crude fat and oil (or fatty oil, which will be collectively referred to only as "oil" hereinafter), 14 – 16 percent of crude protein, 8 – 10 percent of crude fiber, 9 – 12 percent of ash, and 33 – 36 percent of carbohydrates. The content of starch in the carbohydrates is about 40 percent which corresponds to about 10 percent of rice-bran, whereas most of the ash exists as Phytin. Usually, in order to separate the protein from rice-bran, the starting material is dehydrated and extracted of oil and the residues after the extraction of oil are extracted with an alkaline solution and then subjected to a coagulation treatment with an acid to precipitate and obtain the protein. However, the protein in rice-bran undergoes a severe denaturation during the oil extraction treatment and is mixed closely with the starch which makes the extraction with an alkaline solution much more difficult. Accordingly, few successful examples of such extraction of protein from rice-bran have been reported.

2. Summary of the Invention

The present invention provides a process for separating all of the constituents of seeds and brans of cereal grains, particularly rice-bran, by a simple means and in a short time, without using such difficult separation steps as mentioned above.

According to the present invention, rice-bran is pulverized in an aqueous acid solution. If rice-bran alone is pulverized as it is or after it has been dried, the crude fiber and other impurities such as cell-membrane (which will be referred to only as "crude fiber containing substances" hereinafter) are also finely divided, mixed closely with the starch and are difficult to remove, thus lowering the quality of the starch. On the contrary, when rice-bran is pulverized in an aqueous acid solution, the pulverized particle size of the crude fiber containing substances is greatly different from that of the starch, which enables the separation of the more coarse particles of the crude fiber containing substances from the finely divided particles of the starch by screening them with a sieve.

The process of the present invention is explained in further detail below:

The starting materials (rice-bran or oil-containing seeds such as soy bean) are mixed with several times as much as by weight, usually two to 10 times (wt./wt.), preferably four to eight times, of an aqueous acid solution and are pulverized for a short time, for example, a few minutes, in a pulverizer (wet pulverizer such as a mixer, a homogenizer, a desper mill or a supersonic disperser). A time of pulverization of 10–15 minutes will be usually sufficient.

As the aqueous acid solution, a mineral acid such as hydrochloric acid and sulphuric acid or an organic acid such as acetic acid can be used and it is advantageous to adjust the pH value of said acid solution within the range of 1 – 6 at which pH the protein is coagulated. If the pH of the said acid solution is made less than 1, such a low pH will make the consequent filtration operation difficult and will solubilize a portion of the protein to lower the yield of the protein. On the other hand, if the pH is more than 6 or water alone is used instead of an aqueous acid solution, only half the amount of the Phytin contained in the rice-bran is transferred into the water and the remainder of the Phytin is mixed with the starch and the crude fiber containing substances, thus decreasing the purity of the starch and the yield of the Phytin, unless it is not recovered from said mixture. On the contrary, if the starting material is pulverized in an aqueous acid solution of pH 1 to 6 according to the process of the present invention, the Phytin in the rice-bran is transferred completely into the aqueous solution. In addition, the liquid thus obtained by the pulverization is in an emulsified state, in which the protein is bonded with the oil and thus it is not precipitated upon its coagulation. Then, the crude fiber-containing substances of a large particle size are separated from the aqueous solution by screening, or the starch and the crude fiber-containing substances are separated from the aqueous solution by a centrifugal machine. In case the liquid was first treated by screening to remove the crude fiber-containing substances, the obtained aqueous solution is further treated by centrifugation, thus separating the starch from the aqueous solution. On the other hand, in case the liquid was first treated in a centrifugal machine, the obtained mixture consisting of the starch and the crude fiber containing substances is then screened, thus separating the starch and the crude fiber containing substances easily from each other. In separating the crude fiber-containing substances from the starch by screening, the screening operation is carried out in a wet state, usually by using a 200 to 400 mesh sieve, since the average particle size of the pulverized crude fiber-containing substances will be about 110 mesh, whereas the particle size of the carbohydrates (starch) will be about 5 to 10 $\mu$, which will easily pass a 200 to 400 mesh sieve. Accordingly, the use of a 200 mesh sieve is preferable to separate the crude fiber-containing substances. The aqueous solution obtained after the above mentioned centrifugation or screening treatments may be separated into the oil-bonded protein fraction and the liquid fraction by a filtration treatment. The oil-bonded protein fraction (water content of 40 to 50 percent) is then treated with a water miscible solvent (for example, methanol, ethanol and acetone) to separate the protein and the oil from each other. Otherwise, the fraction is dried to a water content less than 5 percent and then, it is treated with an oil extracting organic solvent such as hexane, benzene and toluene to separate the oil and the protein.

The liquid fraction is then made alkaline by the addition of an alkali such as sodium hydroxide, potassium hydroxide and ammonia to precipitate the Phytin therefrom. In this case, the pH of the liquid will be adjusted to the isoelectric point of the Phytin in the range of pH 8 to 10 to precipitate the Phytin as a salt. The precipitated Phytin is separated by filtration or centrifugation for the solution. The remaining solution is a highly nutritious solution containing much vitamin, sugars and soluble protein. The products of the respective ingredients thus separated according to the process of the present invention are oil, protein, starch, Phytin, crude fiber containing substances and a vitamin-rich solution, respectively. The protein thus obtained has a purity of not less than 85 percent and the amino acid composition thereof was similar to that of an egg. The starch thus obtained has excellent properties close to those of rice starch. The crude fiber containing substances thus obtained contain some carbohydrates, starch, protein and oil and can be satisfactorily utilized as an animal feed, which is free of a rice-bran-like odor and even tastes sweet.

In the above, the present invention has been described mainly with reference to the treatment of rice-bran, but the process of the present invention may be applied not only to rice-bran but also to an oil-containing seeds such as soy bean and sesame.

The followings are the specific, nonlimiting examples of the present invention.

All percentages are percent by weight.

EXAMPLE 1

100 g. of commercially available rice-bran containing crushed rice, 10 percent of water, 20 percent of oil, 13 percent of crude protein, 10 percent of crude fiber, 9 percent of ash, 37 percent carbohydrates was pulverized in 400 ml. of an aqueous acid solution acidified with hydrochloric acid to pH of 2.0 and the thus treated aqueous solution was separated into a precipitate and a solution (A) by a centrifugal machine; to the precipitate, 500 ml. of water was added and screened with a 200 mesh-sieve to separate the crude fiber containing substances remained on the sieve from the solution (B). The solution (B) was centrifuged to separate the starch as a precipitate. The amount of the thus separated starch was 14.5 g. after drying. Next, the above solution (A) was filtered to separate the oil-bonded protein and the solution (C). The oil-bonded protein was then treated with 200 ml. of acetone to separate the protein from the solution and acetone was distilled off from the solution to obtain 16.5 g. of the oil and 9 g. of the dried and finely divided powder of protein (purity 86 percent). The above solution (C) was added with an alkali to make the pH of the solution to 9.0 at which pH the Phytin was precipitated, giving 8 g. of the same after drying. On neutralizing the solution after the separation of the Phytin with an acid followed by the evaporation of water, 22 g. of a glutinous solid substance containing vitamin, saccharose and soluble protein was obtained. The amount of the above crude fiber containing substances remained on the sieve was 25 g. after drying and they were found to be composed of 2.2 percent of water, 13 percent of the crude protein, 6 percent of the oil content, 3 percent of the ash content and 27 percent of the crude fiber, which were sufficiently nutritious to be used as an animal feed.

EXAMPLE 2

100 g. of soy bean (water—11 percent, oil content—20 percent, crude fiber—4 percent, ash—5 percent, crude protein—37 percent, carbohydrates—23 percent) was pulverized in an aqueous acid solution acidified with acetic acid to pH of 4.0. After that, the thus treated solution was further treated in the same manner as in Example 1 and 31 g. of protein (purity 85 percent), 16 g. of oil, 2 g. of Phytin, and 18.5 g. of the crude fiber containing substances (cell-membrance and crude fiber) remained on the sieve were obtained.

The embodiments of the invention in which an exclusive property or privilege is claimed are defined as follows:

1. A process for separating and recovering the constituents of a starting material consisting of non-deoiled seeds or brans of cereal grains, said starting material containing the naturally occurring amount of oil of said seeds or bran together with protein, crude fiber, starch, Phytin, water soluble carbohydrates and water, which consists of the steps of
   1. mixing said starting material with an aqeuous acid solution having a pH in the range of from 1 to 6, the amount of said aqueous acid solution being from two to 10 times by weight, of the starting material, and mechanically pulverizing the mixture consisting of said starting material and said aqueous acid solution to obtain a pulverized mixture of components consisting essentially of
      a. a solid phase consisting essentially of large size crude fibers and small size starch particles
      b. a liquid phase consisting essentially of
         i. protein bonded with oil, emulsified in
         ii. an aqueous phase containing dissolved therein Phytin and water soluble carbohydrates;
   2. separating from the mixture and recovering separately the large size crude fibers and small size starch particles;
   3. filtering component (b) and recovering separately constituents (i) and (ii);
   4. then treating constituent (i) with a solvent to recover separately said protein and said oil, and
   5. adjusting the pH of constituent (ii) in the range of 8 to 10 to precipitate Phytin and then separating the precipitated Phytin from the aqueous solution containing dissolved therein the water soluble carbohydrates.

2. A process according to claim 1, in which the seeds or brans are rice-bran.

3. A process according to claim 1, in which the solids are screened by passing same in a wet state through a screen having a mesh size in the range of 200 to 400 meshes per inch.

4. A process according to claim 1, in which step (2) comprises screening the pulverized mixture with a screen having a mesh size in the range of 200 to 400 mesh to separate the large size crude fibers and then centrifuging the remainder of the mixture to separate therefrom the small size starch particles.

5. A process according to claim 1, in which step (2) comprises centrifuging the pulverized mixture to separate component (a) from component (b) and then screening component (a) using a screen having a mesh size in the range of 200 to 400 mesh to separate the large size crude fibers from the small size starch particles.

6. A process according to claim 1, in which step (4) comprises adding a water miscible solvent to constituent (i).

7. A process according to claim 1, in which step (4) comprises drying constituent (i) to a water content of less than 5 percent and then treating same with an oil-extracting solvent.

* * * * *